United States Patent Office 2,715,112
Patented Aug. 9, 1955

2,715,112
ACRYLONITRILE POLYMERS STABILIZED WITH CERTAIN GLYCOL ETHERS

George W. Stanton and Forrest A. Ehlers, Walnut Creek, Calif., assignors to The Dow Chemical Company, Midland, Mich., a corporation of Delaware No Drawing. Application September 4, 1952,
Serial No. 307,917

8 Claims. (Cl. 260—45.7)

This invention relates to compositions of matter consisting essentially of a polymer containing at least 60 per cent of acrylonitrile in the polymer molecule, and a stabilizing agent to protect the polymer from the embrittling or discoloring effects of exposure to light or heat.

Polyacrylonitrile and copolymers containing acrylonitrile as the predominant constituent undergo undesirable physical changes upon prolonged exposure to light or to heat. The observable symptoms of such changes are embrittlement or discoloration, or both, due, in varying measure to the action of either light or heat. Since the uses to which such polymers are put include the manufacture of molded articles and thin films, either embrittlement or discoloration is to be avoided, if possible. To this end, it would be desirable to provide agents which can be admixed with the polymers to protect them against one or more of the adverse effects of the conditions to which they may be exposed. The provision of stabilized compositions of the polymers and such protective agents is the principal object of the present invention.

This object is realized, according to the invention, by mixing with the polymer from 1 to 20 per cent, and preferably from 5 to 15 per cent by weight of a glycol ether having the formula

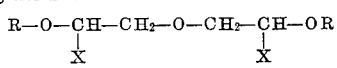

wherein each X is selected from hydrogen and methyl, one R is selected from methyl and ethyl and the other R is selected from hydrogen, methyl and ethyl. Articles made from the resulting compositions show little or no tendency to discolor upon prolonged exposure to ultraviolet light, and exhibit little of the tendency to become brittle as a result of such exposure, especially when the stabilizer is present at concentrations of 5 per cent or more.

A copolymer of 80 per cent acrylonitrile and 20 per cent isobutylene was prepared in aqueous emulsion, the polymeric particles were coagulated by addition of magnesium chloride solution, and the coagulum was washed and dried. This copolymer was found to be soluble to the extent of over 15 per cent by weight in acetone. In evaluating the various stabilizers, a 15 per cent solution of the copolymer in acetone was prepared, an amount of stabilizer equal to 15 per cent of the weight of copolymer was dissolved in the solution, and films were cast from the solution on glass plates. The films were dried in air overnight, then at 70° C. for one hour. The resulting films were mounted near the rim of a horizontal turntable, with half of the film covered and the other half exposed. The turntable was set in motion in a Fadeometer, and the exposed films were irradiated for 120 hours. The several films were then tested with a photoelectric reflection meter which had been set to read 100 when turned toward a glazed white tile (see footnote). An exposed but untreated film of the copolymer gave readings of about 70 and had a light tan color, while the covered and unexposed portions of all the films gave readings of 90 to 96, using the white tile standard as a background.

Results with typical compounds in the recited class are given below:

| Test Compound | Reflection meter reading after 120 hrs. in Fadeometer |
|---|---|
| (Stabilizers): | |
| None | about 70. |
| Diethylene glycol monomethyl ether | about 89. |
| Diethylene glycol dimethyl ether | Do. |
| Diethylene glycol monoethyl ether | over 89. |
| Diethylene glycol diethyl ether | about 80. |
| Dipropylene glycol monomethyl ether | about 89. |
| Dipropylene glycol diethyl ether | about 80. |
| For contrast (non-stabilizers): | |
| Diethylene glycol | about 70. |
| Tetraethylene glycol | Do. |
| Hexapropylene glycol | Do. |
| Ethylene glycol monomethyl ether | Do. |
| Ethylene glycol monoethyl ether | Do. |
| Diethylene glycol monoisopropyl ether | Do. |
| Propylene glycol monoethyl ether | Do. |
| Tripropylene glycol monomethyl ether | Do. |

Whenever the above-noted and other compounds falling under the previously defined general formula are blended, at concentrations of at least 1 per cent by weight, with a polymeric body containing at least 60 per cent of acrylonitrile in the polymer molecule, the stability of the polymeric body to light and heat is improved materially. This is found to be true not only with the copolymer of the examples but also with polyacrylonitrile and copolymers of acrylonitrile with such diverse copolymerizable materials as vinyl chloride, vinyl acetate, methyl and other alkyl acrylates or methacrylates, the vinyl pyridines, allyl alcohol, and many others.

We claim:

1. A composition of matter the essential constituents of which are a polymeric body containing at least 60 per cent by weight of acrylonitrile polymerized in the polymer molecule, any balance being another monoethylenically unsaturated compound copolymerized with acrylonitrile, and, as a stabilizing agent therefor, from 1 to 20 per cent by weight of a glycol ether having the formula

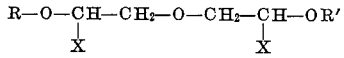

wherein X is a member of the group consisting of hydrogen and methyl, R is a member of the group consisting of methyl and ethyl and R' is a member of the group consisting of hydrogen, methyl and ethyl.

2. The composition claimed in claim 1, wherein the defined stabilizing agent is monoalkyl ether of diethylene glycol.

3. The compositions claimed in claim 2, wherein the stabilizing agent is diethylene glycol monoethyl ether.

4. The composition claimed in claim 1, wherein the defined stabilizing agent is a dialkyl ether of diethylene glycol.

5. The composition claimed in claim 4, wherein the stabilizing agent is diethylene glycol dimethyl ether.

6. The composition claimed in claim 1, wherein the defined stabilizing agent is an ether of dipropylene glycol.

7. The composition claimed in claim 6, wherein the stabilizing agent is dipropylene glycol monomethyl ether.

8. The composition claimed in claim 1, wherein the stabilizer is present in amount of 5 to 15 per cent of the weight of the polymer.

References Cited in the file of this patent

UNITED STATES PATENTS 2,416,667    Schroeder _____ Mar. 4, 1947

---

NOTE.—In the Fadeometer employed, two type S-4 General Electric sunlight lamps are disposed horizontally and parallel to one another, with the centers of the bulbs 4 inches apart, at a height 5.75 inches above, and displaced 6 inches from the center of a 12-inch turntable driven at 33⅓ revolutions per minute. The reflection meter used is a Model 610, made by the Photovolt Corporation, 95 Madison Ave., New York city, having a tristimulus blue filter and set to read 100 when turned toward a color-standard white ceramic "Vitrolite" tile supplied by Gardner Laboratories, Bethesda, Maryland.